(12) United States Patent
Faifer (10) Patent No.: US 7,823,855 B2
(45) Date of Patent: Nov. 2, 2010

(54) GRIP WITH BIPOD

(76) Inventor: Sagi Faifer, POB 280, 43 Yaakov Olamy, Moshav Mishmar Hashiva (IL) 50297

( * ) Notice: Subject to any disclaimer, the term of this patent is extended or adjusted under 35 U.S.C. 154(b) by 0 days.

(21) Appl. No.: 12/648,321

(22) Filed: Dec. 29, 2009

(65) Prior Publication Data

US 2010/0084524 A1 Apr. 8, 2010

Related U.S. Application Data

(63) Continuation-in-part of application No. 12/190,604, filed on Aug. 13, 2008.

(60) Provisional application No. 60/955,406, filed on Aug. 13, 2007.

(51) Int. Cl.
*F16M 11/32* (2006.01)

(52) U.S. Cl. .................. 248/440.1; 248/166; 248/188.5; 42/94

(58) Field of Classification Search ................ 248/166, 248/170, 171, 176.3, 188.2, 188.5, 188.6, 248/291.1, 292.12, 440.1, 436, 439, 649, 248/688; 42/72, 73, 90, 94; 89/1.42, 37.03, 89/37.04, 40.06; 16/374; 403/113; 396/420, 396/428; 211/64; D22/108, 199
See application file for complete search history.

(56) References Cited

U.S. PATENT DOCUMENTS 3,235,997 A * 2/1966 Stoner ........................... 42/94

| 4,545,660 | A | | 10/1985 | Rudolf |
| 4,984,090 | A | | 1/1991 | Sasaki |
| 6,113,040 | A | * | 9/2000 | Yu ............................... 248/166 |
| 6,289,622 | B1 | * | 9/2001 | Desch et al. ................... 42/94 |
| 6,663,071 | B2 | * | 12/2003 | Peterson .................. 248/440.1 |
| 6,843,015 | B2 | | 1/2005 | Sharp |
| 7,032,494 | B2 | * | 4/2006 | Wygant ..................... 89/37.04 |
| 7,143,672 | B1 | * | 12/2006 | Di Bitonto et al. ............ 81/417 |
| 7,197,844 | B2 | | 4/2007 | Benson |
| 7,584,568 | B1 | | 9/2009 | Brownlee |
| 2005/0241206 | A1 | | 11/2005 | Teetzel |
| 2006/0278797 | A1 | * | 12/2006 | Keng et al. ................ 248/440.1 |
| 2008/0052979 | A1 | | 3/2008 | Lee |
| 2009/0038199 | A1 | | 2/2009 | Oz |
| 2009/0038200 | A1 | | 2/2009 | Keng |

FOREIGN PATENT DOCUMENTS

| GB | 2456545 | | 7/2009 |
| JP | 02118400 A | * | 5/1990 |

* cited by examiner

*Primary Examiner*—Gwendolyn Baxter
(74) *Attorney, Agent, or Firm*—Deborah A. Gabor (57) ABSTRACT

A grip including at least two hinged monopods, each having an independent leg extension, the monopods in the closed position forming a hand grip, and a mounting assembly for mounting the grip on a device, and a method for forming the grip. Preferably, the leg extension includes a housing in each of the monopods and at least one spring biased leg telescopingly mounted in the housing.

12 Claims, 9 Drawing Sheets

GRIP WITH BIPOD

This application is a Continuation In Part of U.S. patent application Ser. No. 12/190,604, and claims the benefit of U.S. Provisional Application No. 60/955,406, filed Aug. 13, 2007, the entire disclosures of which are incorporated herein by reference.

FIELD OF THE INVENTION

The present invention relates to bipods for firearms, cameras and other devices. More particularly the invention relates to a support grip which is also a bipod.

BACKGROUND OF THE INVENTION

A foregrip is a grip on the front of a firearm that can be used to help support the firearm, and prevents burns from the barrel during firing. The foregrip is preferably shaped for comfortable gripping with a hand, for example, having a rounded shape.

A bipod is a device having two legs used to position, support, and stabilize a device which requires aiming, such as a firearm or a camera. Bipods may be independent devices for removable mounting on the device, or may be integrally formed therewith. Bipods with adjustable legs are well known in the art, such as U.S. Pat. No. 5,711,103 to Keng. The bipod described by Keng does not form a grip, rather the bipod is provided with side bodies forming a grip in the closed position.

U.S. Pat. No. 7,111,424 to Moody discloses a combination of a grip and a bipod. Moody teaches a grip with a concealable and collapsible bipod. The grip includes a tubular recess that serves as a housing for the bipod legs when concealed and for a sliding piston assembly that deploys the bipod legs. Moody teaches a complicated mechanism for sliding the piston, and a spring-loaded fulcrum release mechanism positioned at the top of the handle.

A disadvantage of the bipod of Moody is that the legs are deployed together with one another and extend from the bottom of the grip. Furthermore, the legs are limited to the same length, since there is only one piston mechanism for both of the legs.

Accordingly, there is a long felt need for a simple single device that provides a bipod having separately adjustable legs, in one mode, and a comfortable handgrip, in a second mode.

SUMMARY OF THE INVENTION

There is provided, according to the present invention, a grip including at least two hinged monopods, each having an independent telescopic structure. In the closed position, the monopods together form a shaped hand grip. Each of the monopods defines a head portion having an arched portion. The head portion further includes first and second shoulder portions, one shoulder portion defined on each side of the arched portion. The grip further includes a hinge housing holding the head portions of the monopods. The first shoulder portion is arranged to engage the hinge housing in a deployed position, and the second shoulder portion is arranged to engage the hinge housing in said closed position.

According to some embodiment, the telescopic structure in each of the monopods includes a housing with at least one spring biased telescoping leg extending from the housing. Each monopod further includes release means for independently releasing the leg extension therefrom.

Preferably, the grip further includes a mounting assembly for removably mounting the grip on a device, the mounting assembly being coupled to the hinge housing.

In some embodiments of the present invention, each monopod includes locking means for locking the telescoping leg at a desired position (extension) relative to the housing. The locking means may include at least two locking grooves along each telescoping leg and a spring biased locking member inside the housing arranged to selectably engage one of the grooves.

Preferably, the monopods further include fastening elements for fastening the monopods to each other. The fastening elements may include a fastening hook on at least one of the telescoping legs engageable inside the housing of the other telescoping leg.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a combination of a grip and a bipod formed of hinged monopods. In the deployed positions, the monopods act as a bipod, which can be used to position, support, and stabilize a device, such as a firearm, camera and so on, which needs stabilization when aimed at a target. When the monopods are in the closed position, they form a hand grip, which can be used to support and control the device on which it is mounted. Preferably, the grip is ergonomically shaped to provide a comfortable and secure grip.

The grip, according to the present invention, includes at least two hinged monopods, each having an independent telescopic structure. In the closed position, the monopods together form a shaped hand grip. Each of the monopods defines a head portion having an arched portion. The head portion further includes first and second shoulder portions, one shoulder portion defined on each side of the arched portion. The grip further includes a hinge housing holding the head portions of the monopods. The first shoulder portion is arranged to engage the hinge housing in a deployed position, and the second shoulder portion is arranged to engage the hinge housing in the closed position.

Figure 1:
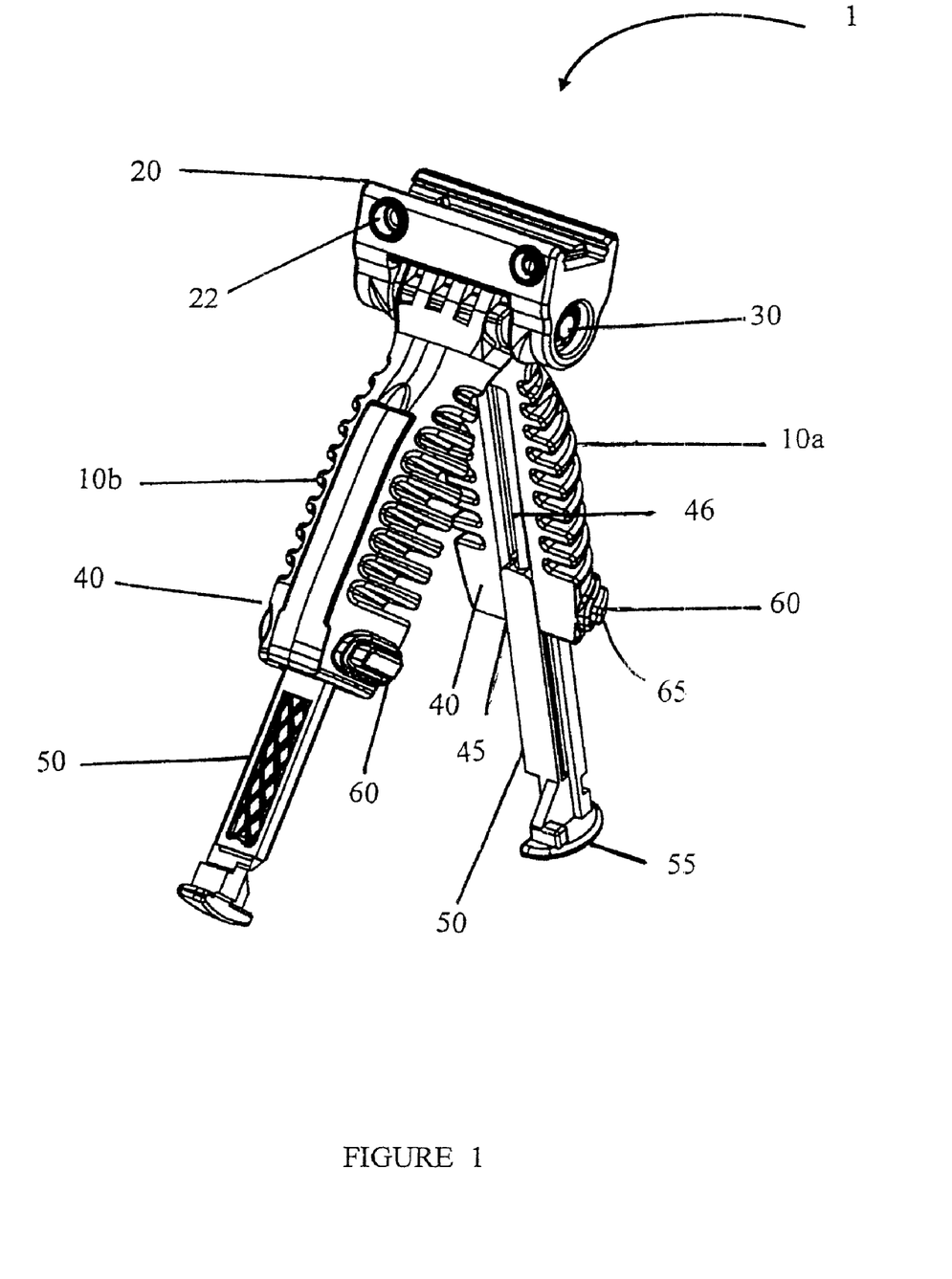
FIG. 1 is a perspective illustration of a grip constructed and operative in accordance with one embodiment of the present invention in deployed position.
Figure 2:
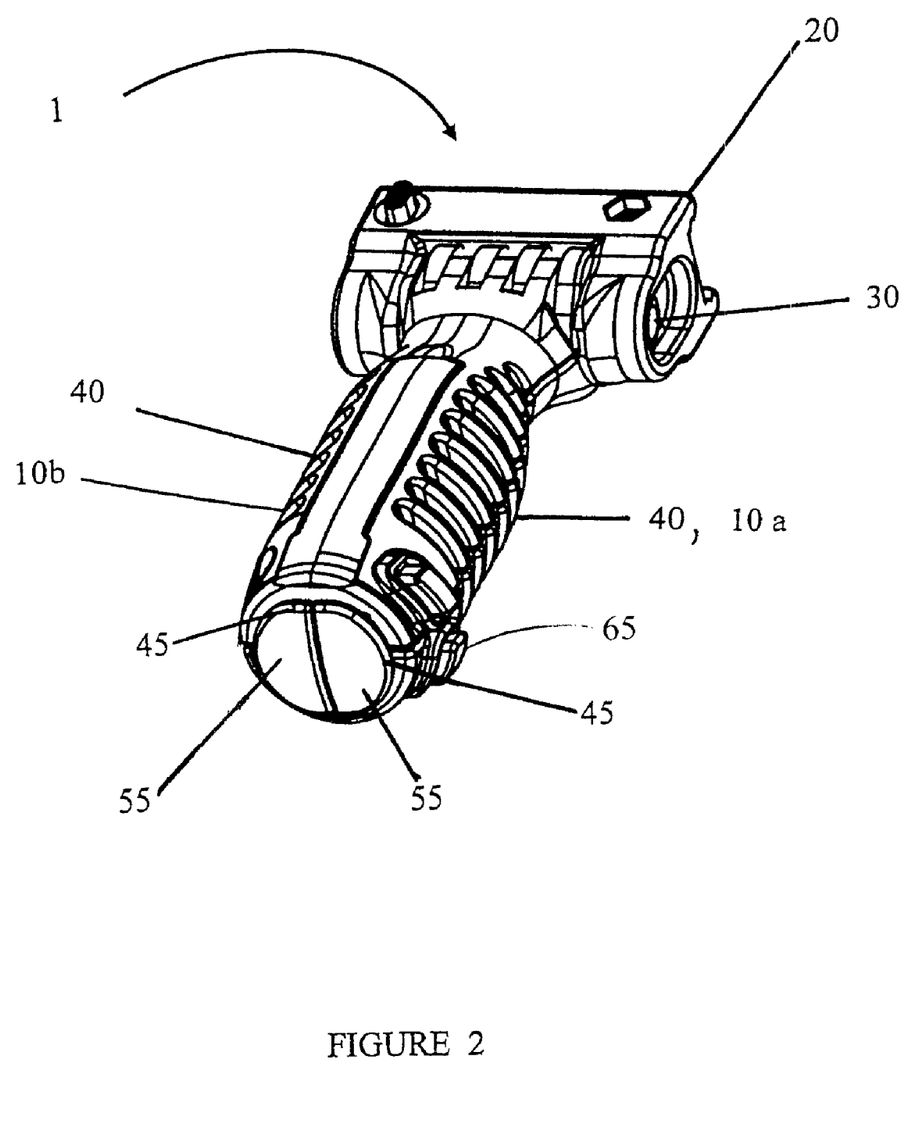
FIG. 2 is a bottom perspective illustration of the grip of FIG. 1 in a closed position.

Referring to FIGS. 1 and 2, there are shown schematic perspective illustrations of a grip 1 constructed and operative in accordance with one embodiment of the present invention, in the deployed and closed positions, respectively. Grip 1 includes two monopods 10a and 10b and a mounting assembly 20 for mounting the grip on the device. The mounting assembly 20 may feature an adaptable mounting head to interface with a mounting rail, such as a Weaver or Picatinny Rail, or may be a simple bolt attachment to a selected device, such as a firearm. A securing element 22 may be provided to secure the mounting assembly 20 to a rail of the device.

At the bottom of the mounting assembly 20, there is a hinge 30 holding monopods 10a and 10b, allowing the monopods to pivot to the deployed position shown in FIG. 1 or to the closed position shown in FIG. 2. According to the illustrated embodiment, each of monopods 10a and 10b includes a spring biased leg extension 50 telescopically mounted in tracks 46 in a housing 40. Each leg extension 50 is adapted to slide in and out housing 40 through opening 45. Each telescoping leg 50 includes a foot 55 which may be attached to leg 50 by known means or may be integral with leg extension 50. Feet 55 are preferably complementary to each other when in the closed position. An example of two complementary shapes is shown in FIG. 2, where each of feet 55 is substantially semi-circular at its base so as to create a circular shape when in the closed position. The shape of feet 55 preferably fits the shape of the bottom of housing 40, creating a complete hand grip when in the closed and retracted position.

The bipod in grip 1 can be deployed in different positions. In the completely deployed position, grip 1 opens to two monopods 10a and 10b pivoted apart from each other. Springs 15 (best seen in FIG. 3), or other extension mechanism, cause legs 50 to extend out of monopods 10a, 10b, to the desired length. According to this embodiment, extending each of legs 50 is carried out by pressing release means, here illustrated as a buttons 65, which actuates a locking member 60 (shown in FIG. 3). Pressing buttons 65 releases each of legs 50 from the openings 45 of housings 40. Alternatively, other release means may be used. The release means can be located in any convenient location on the grip, i.e., near the mounting assembly or in the handle. Buttons 65 are independent relative to each other and can be pressed separately. Thus, a particular feature of the grip is that the height of each monopod can be fixed independently. On the other hand, the release means of the two monopods are preferably disposed close enough to one another that they can be pressed simultaneously, for rapid deployment, if desired.

In the closed position, shown in FIG. 2, the monopods are held together forming the grip and legs 50 slide into tracks 46 in housing 40. In this position, the monopods can be fastened to one another.

Figure 3:
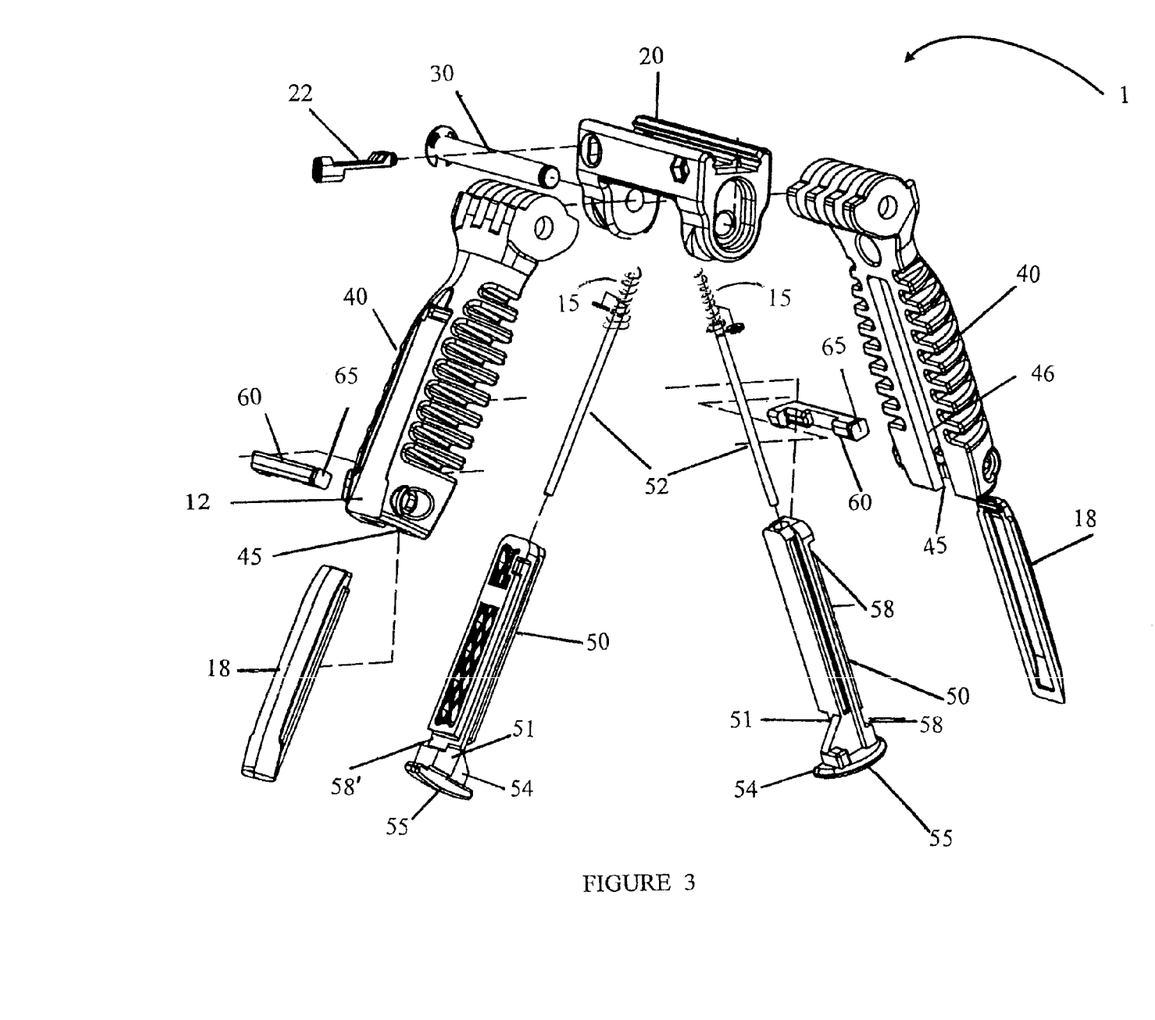
FIG. 3 is an exploded view of the grip of FIG. 1.

Referring now to FIG. 3, there is shown an exploded view of the grip of FIG. 1. FIG. 3 shows locking members 60, according to one embodiment of the invention, mounted inside each housing 40. Each of legs 50 includes a first locking groove 58 on the top end, and a second locking groove 58' near the bottom end adjacent foot 55. Locking member 60 engages groove 58 on the top or locking groove 58' on the bottom, in order to lock each of leg 50 in the extended or retracted position, respectively. It will be appreciated that locking of legs 50 in either position may be carried out in any other known manner. Each of stop members 60 protrudes out of a housing 40 and defines a release button 65.

According to this embodiment, grip 1 further includes removable pressure pad plates 18 that can be inserted into grooves 12 of the grip. An electric pressure switch (not shown), for example, of a laser or a spotlight, can be inserted into the grooves 12 and covered by the pad plates 18 and be activated from outside to turn on and off a laser or another electric device, without providing access to dirt from outside the grip into the switch.

According to this embodiment, monopods 10a and 10b are fastened one relative to the other with a fastening hook 54 on each of feet 55. The bottom of each of legs 50 includes a partial cutaway section 51 for receiving the fastening hook 54 of the opposite leg, allowing the two legs to join together, as shown in FIG. 2. When the monopods are joined together, fastening hook 54 of each of the legs is received in partial cutaway section 51 of the opposite leg. When legs 50 are fully inserted into housings 40 through openings 45, fastening hook 54 of each of monopods 10a, 10b seats in opening 45 of the opposite monopod, thereby fastening the two monopods and preventing them from moving apart from one another.

Figure 4:
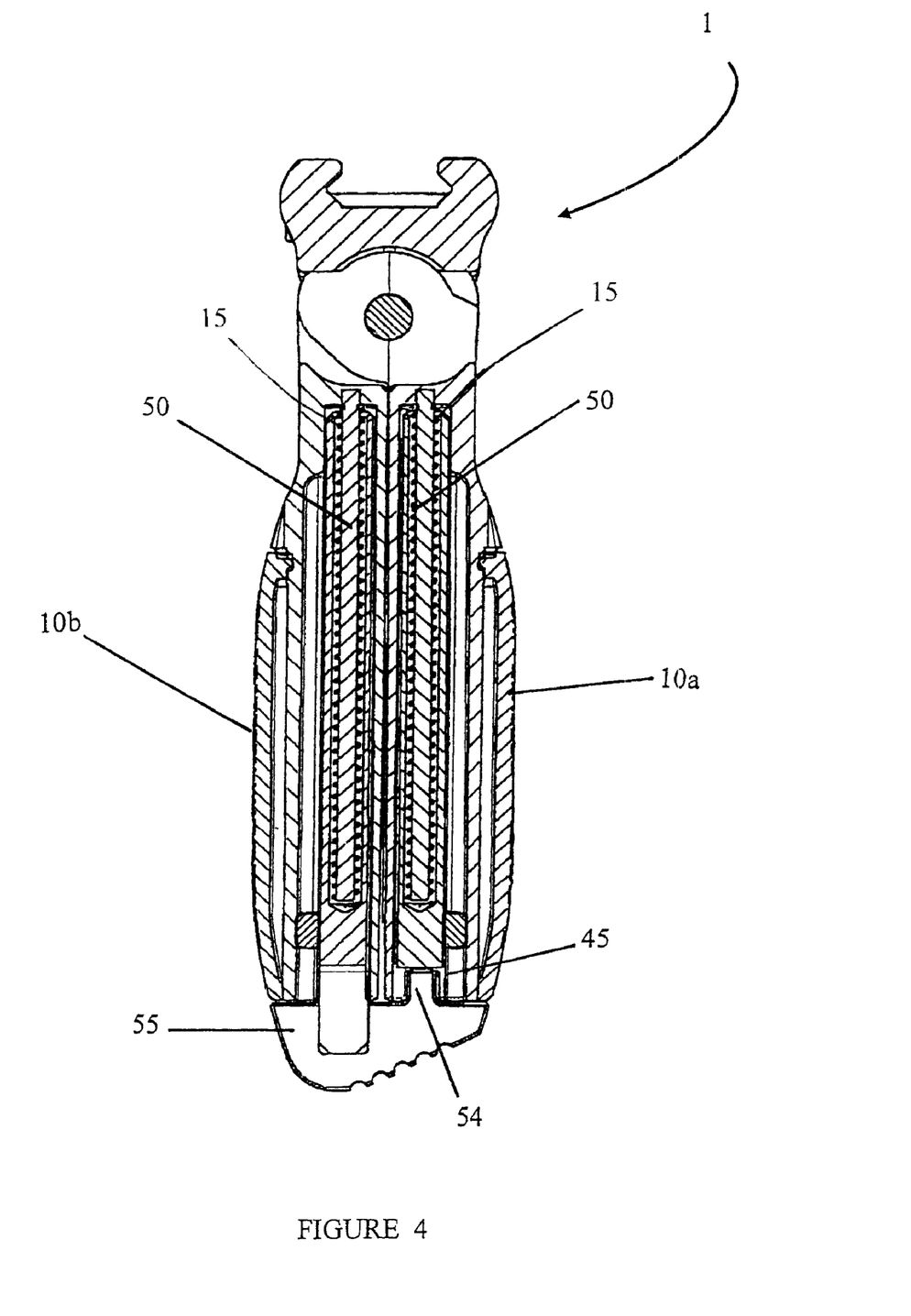
FIG. 4 is a sectional view of the grip of FIG. 1 in a closed position.
Figure 5:
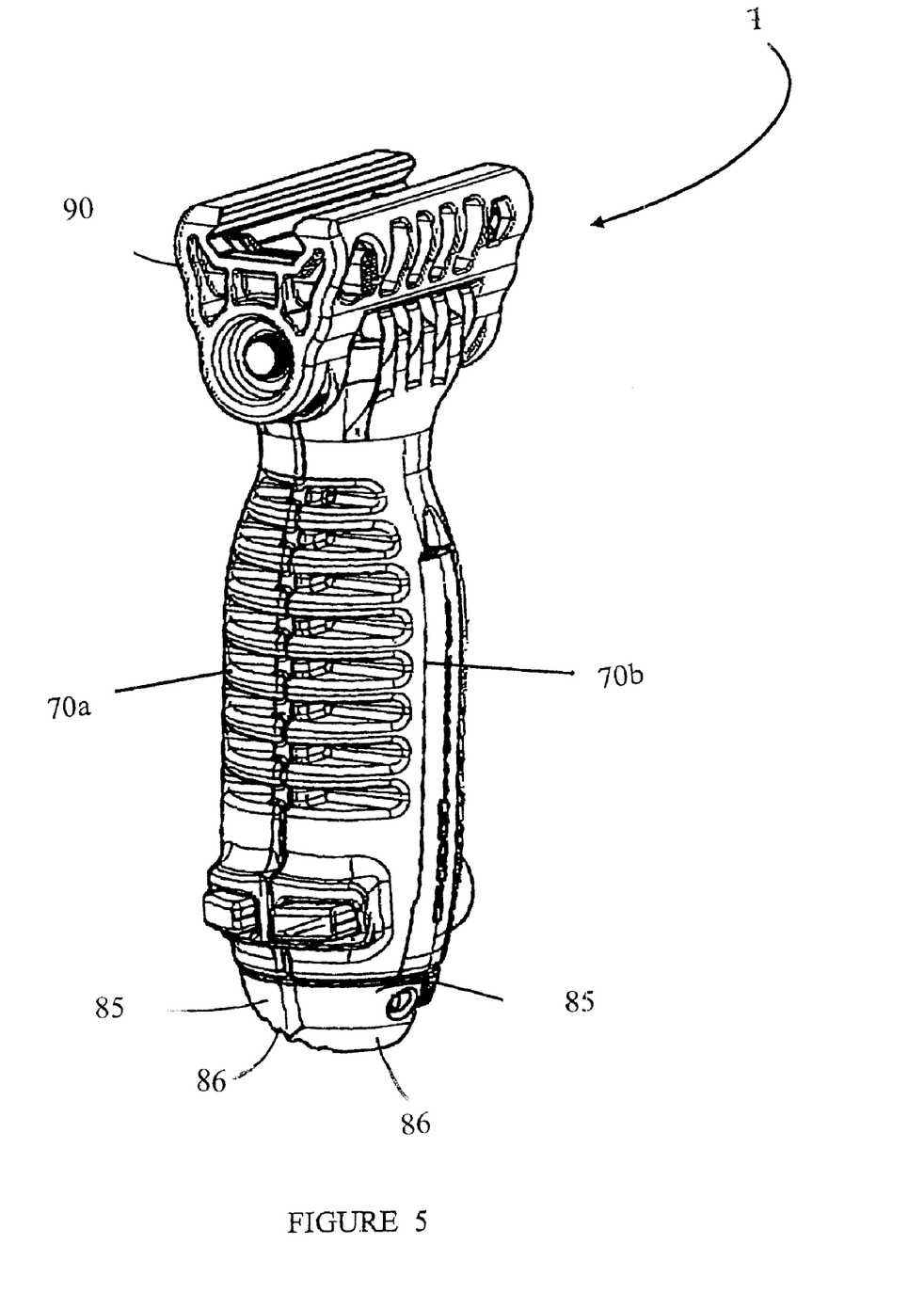
FIG. 5 is a front perspective view of the grip of FIG. 1 in a closed position.

FIG. 4 is a sectional view of the grip 1 and shows fastening hook 54 of monopod 10b engaged in cutaway section 51 of monopod 10a. In this position, fastening hook 54 of foot 10a engages cutaway section 51 of monopod 10b (not shown). It will be appreciated that fastening monopods 10a and 10b relative to each other may be accomplished in various other ways known in the art. According to this arrangement, deploying the monopods and spreading them apart from one another must be carried out by releasing the fastening hooks 54 of both monopods 10a and 10b. Thus, unintentional deployment of monopods 10a and 10b caused by accidentally pressing on one release button 65 is precluded.

Figure 7A:
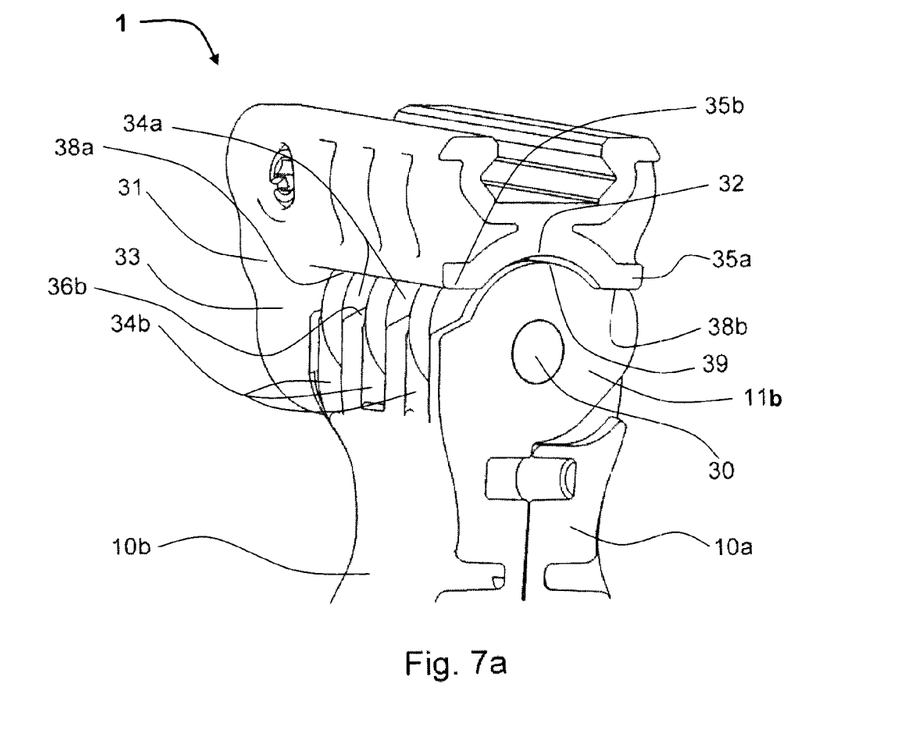
FIG. 7a is a partial sectional view of the grip of FIG. 1 in a closed position.
Figure 7B:
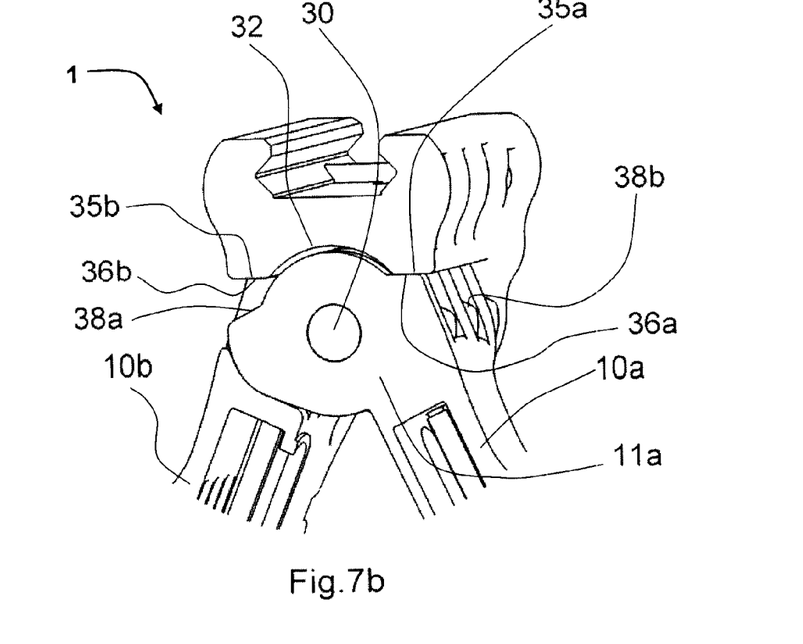
FIG. 7b is a partial sectional view of the grip of FIG. 1 in a deployed position.

FIGS. 7a and 7b show partial sectional views of bipod 1 of FIGS. 1-4 in closed and deployed positions, respectively. Bipod 1 includes a hinge housing 31 having side portions 33 for holding hinge 30. The top of hinge housing 31 includes a first side portion 35a, a second side portion 35b, and an arched portion 32 defined therebetween. Hinge housing 31 may be coupled to or integrally formed with mounting assembly 20.

Each monopod 10a and 10b defines a rounded head portion 11a and 11b respectively, which is engaged by hinge housing 31. Each of head portions 11a and 11b defines a complementary arched portion 39, complementary to arched portion 32 on hinge housing 31. Each head portion 11a and 11b further includes two shoulder portions, one defined on each side of complementary arched portion 39. A first shoulder portion 36a is defined on monopod 10a on one side of complementary arched portion 39 and a second shoulder portion 38a is defined on the opposite side of complementary arched portion 39. Similarly, a first shoulder portion 36b is defined on monopod 10b on one side of complementary arched portion 39 and a second shoulder portion 38b is defined on the opposite side of complementary arched portion 39. Head portions 11a and 11b include a plurality of cutaway portions defining teeth 34a and 34b, respectively. Teeth 34a on head 11a are arranged for pivotal interleaving with teeth 34b on head 11b of monopod 10b.

Head portions 11a and 11b are held inside hinge housing 31 opposite one another (mirror image), allowing respective teeth 34a and 34b to interleave. In this way, complementary arched portions 39 of monopods 10a and 10b engage arched portion 32. In addition, first shoulder portion 36a of monopod 10a and second shoulder 38b of monopod 10b are disposed substantially near first side portion 35a defined on one side of hinge housing 31. At the same time, first shoulder portion 36b of monopod 10b and second shoulder 38a of monopod 10a are disposed substantially near second side portion 35b, defined on the other side of hinge housing 31.

When monopods 10a and 10b are in the deployed position, as seen in FIG. 7a, first shoulder portion 36a of monopod 10a abuts first side portion 35a, while first shoulder portion 36b, of monopod 10b, abuts second side portion 35b. When monopods 10a and 10b are in the closed position, second shoulder portion 38a of monopod 10a, abuts second side portion 35b on hinge housing 31, while second shoulder portion 38b of monopod 10b abuts first side portion 35a. Thus, first and second side portions 35a and 35b limit the rotation of monopods 10a and 10b, and provide grip 1 with firmness and stability, in both the closed and the deployed position. According to this arrangement, when the grip is in the deployed (bipod) position, the weight of the firearm, itself, urges first shoulder portion 36a, 36b of monopods 10a and 10b to engage firmly side first and second side portions 35a and 35b, respectively. Thus, the firearm can be steadily disposed on a surface. Furthermore, when the grip is in the closed (grip) and fastened position, second shoulder portions 38a, 38b of monopods 10a and 10b firmly engage first and second side portions 35b and 35a, respectively, so there is substantially no freedom between the grip and the firearm.

FIGS. 5 and 6a to 6c show a grip 7 according to another embodiment of the invention. Grip 7 is substantially similar to grip 1, and includes at least two monopods 70a and 70b, and a mounting assembly 90 for mounting the grip on the device. Each of monopods 70a and 70b includes a housing 75, having a leg extension 80 telescopically mounted therein. Each leg 80 includes a foot 85, with a fastening hook 84.

Figure 6A:
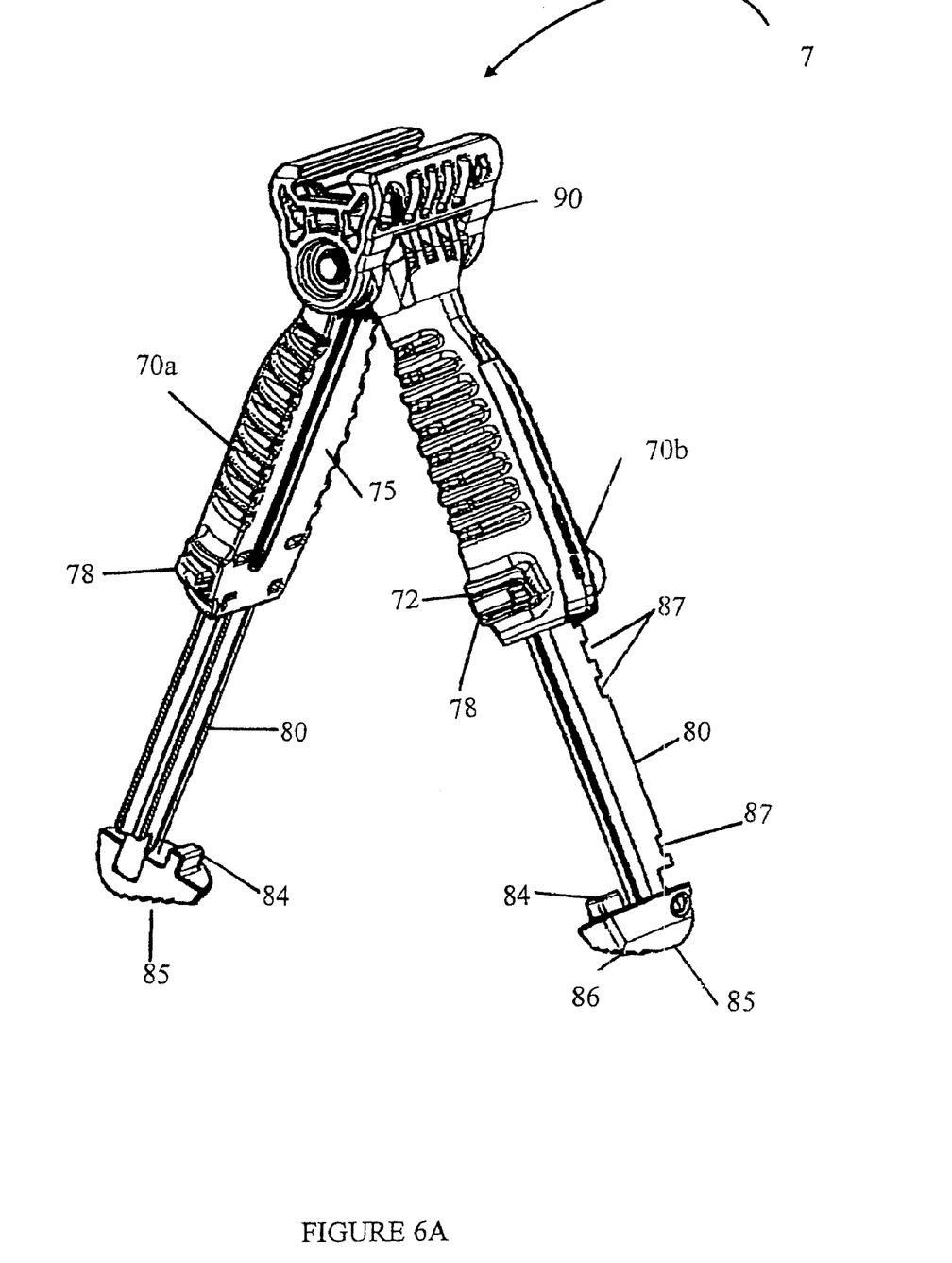
FIG. 6a is a perspective view of another embodiment of a grip in a deployed position.
Figure 6B:
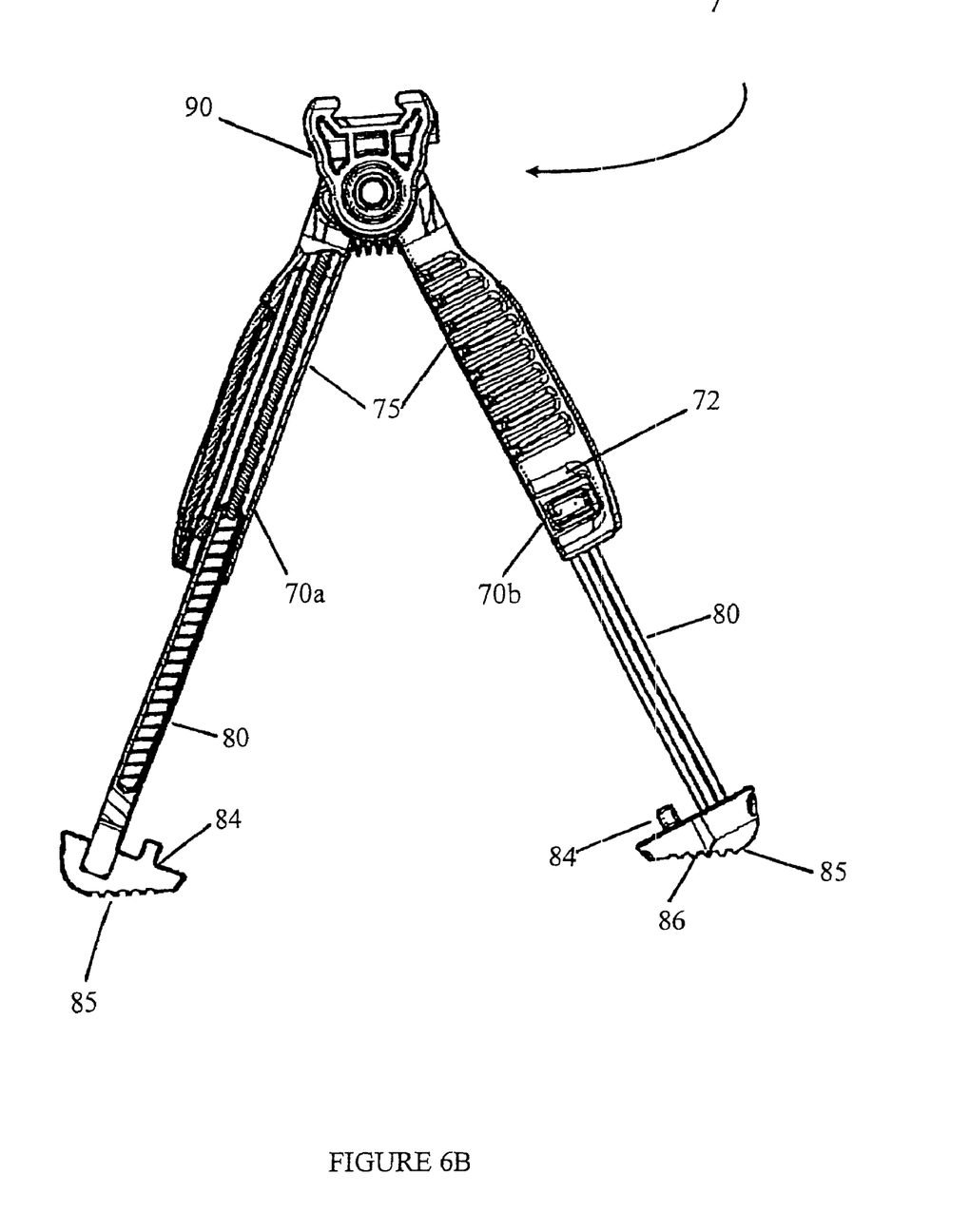
FIG. 6b is a partially cutaway front view of the grip of FIG. 6a in the deployed position.
Figure 6C:
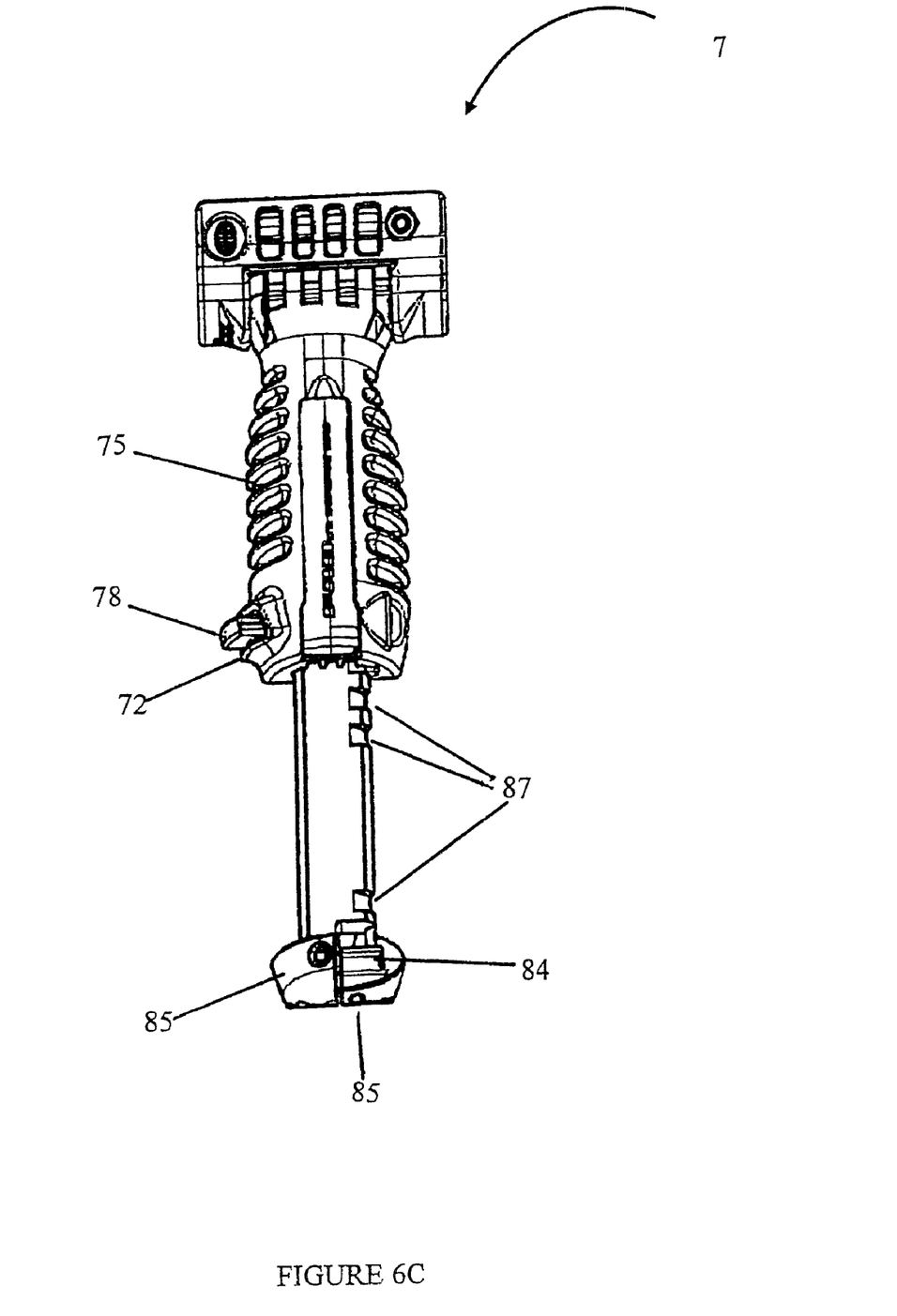
FIG. 6c is a side view of the grip of FIG. 6a with the unlocked telescoping legs together.

According to this embodiment, the bottom of each foot 85 is slanted and includes ridges 86 so as to enhance the frictional engagement with the surface on which the bipod is deployed and, thus, to increase the stability of monopods 70 on the ground when in the deployed position.

In addition, each leg 80 may be extended to the desired length and locked independently, thereby allowing the user to adjust the height and angle of the device on the bipod according to his preference and to stabilize the device on an uneven surface by extending one of legs 80 more than the other. A locking member may be provided to lock leg 80 relative to housing 75 at any desired length. According to the embodiment illustrated in FIGS. 6a-6c, adjusting the length of telescoping legs 80 is accomplished by engaging a stop member (not shown) inside one of a plurality of locking grooves 87 defined along the length of legs 80. The stop members may each be spring biased inside housing 75 and protrude outside the housings through apertures 72 to define push buttons 78. Each of buttons 78 is an independent button which can be pressed separately, in order to adjust the length of its associated leg, or together, to release both legs substantially simultaneously.

The present invention can be modified to form a tripod, formed of three monopods, using three separate hinges around a ring instead of a single hinge 30 as described above, or to a grip formed of any desired number of monopods.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A grip comprising:
   at least two hinged monopods, each having an independently extendable leg extension telescopically mounted therein, said monopods in a closed position forming a hand grip, each of said monopods defining a head portion including an arched portion and first and second shoulder portions, one shoulder portion defined on each side of said arched portion; and,
   a hinge housing holding said head portions of said monopods;
   wherein said first shoulder portion of each said monopod is arranged to engage said hinge housing in a deployed position and said second shoulder portion of each said monopod is arranged to engage said hinge housing in said closed position.

2. The grip according to claim 1, further comprising a mounting assembly for removably mounting the grip on a device, said mounting assembly being coupled to said hinge housing.

3. The grip according to claim 1, wherein each said monopod further comprises a housing and each said leg extension is spring biased in a track in said housing.

4. The grip according to claim 1, wherein each said monopod further comprises release means for independently releasing said leg extension therefrom.

5. The grip according to claim 1, wherein each said monopod further comprises locking means for independently locking said leg extension at different lengths relative to said monopod.

6. The grip according to claim 5 wherein said locking means comprises:
   at least two locking grooves in said leg extension; and
   a spring biased locking member inside said monopod selectably engageable in each of said grooves.

7. The grip according to claim 1, wherein each said monopod further comprises fastening means for locking the leg extension of one said monopod to the other said monopod when said hand grip is formed.

8. The grip according to claim 7, wherein said fastening means comprises a fastening hook on at least one of said leg extensions engageable inside the monopod of another said leg extension.

9. A method for forming a grip comprising:
   forming at least two hinged monopods, each having an independent leg extension telescopically mounted therein, said monopods in a closed position forming a hand grip;
   defining on each of said monopods a head portion including an arched portion and first and second shoulder portions, one shoulder portion defined on each side of said arched portion;
   mounting said head portions of said monopods in a hinge housing such that, in a deployed position said first shoulder portion of each said monopod engages said hinge housing and in a closed position said second shoulder portions of each said monopod engages said hinge housing.

10. The method according to claim 9, further comprising providing release means on each of said monopods, for independently releasing each leg extension from a monopod.

11. The method according to claim 9, further comprising providing fastening means on each said monopod for locking the leg of one said monopod to the other said monopod when said hand grip is formed.

12. The method according to claim 11 further comprising forming a fastening hook on at least one of said leg extensions for engaging the inside the monopod of another said leg extension.

* * * * *